United States Patent
Gustafsson et al.

(10) Patent No.: US 11,030,552 B1
(45) Date of Patent: Jun. 8, 2021

(54) CONTEXT AWARE RECOMMENDATION OF ANALYTIC COMPONENTS

(71) Applicant: TIBCO Software Inc., Palo Alto, CA (US)

(72) Inventors: Tomas Jörgen Gustafsson, Gothenburg (SE); Gustav Sebastian Karlberg, Gothenburg (SE); Per Erik Vilhelm Brandin, Kungsbacka (SE); Magnus Niklas Amberntsson, Mölndal (SE); Nils Magnus Rylander, Gothenburg (SE); Jonas Mikael Svensson, Gothenburg (SE); Anders Erik Jakob Gavare, Gothenburg (SE); Lars Martin Sjögren, Gothenburg (SE); Knut Tobias Lehtipalo, Gothenburg (SE); Sven Anders Fougstedt, Gothenburg (SE); Johanna Sofia Altenstedt, Gothenburg (SE); Maria Christine Redström, Gothenburg (SE)

(73) Assignee: TIBCO SOFTWARE INC., Palo Alto, CA (US)

(*) Notice: Subject to any disclaimer, the term of this patent is extended or adjusted under 35 U.S.C. 154(b) by 316 days.

(21) Appl. No.: 14/925,901

(22) Filed: Oct. 28, 2015

Related U.S. Application Data

(60) Provisional application No. 62/073,229, filed on Oct. 31, 2014.

(51) Int. Cl.
*G06Q 10/06* (2012.01)
*G06T 11/20* (2006.01)
*G06F 40/106* (2020.01)

(52) U.S. Cl.
CPC .......... *G06Q 10/063* (2013.01); *G06F 40/106* (2020.01); *G06T 11/206* (2013.01)

(58) Field of Classification Search
None
See application file for complete search history.

(56) References Cited

U.S. PATENT DOCUMENTS

| 6,400,366 B1 * | 6/2002 | Davies | G06T 11/206 345/440 |
| 6,523,040 B1 * | 2/2003 | Lo | G06F 40/177 |

(Continued)

FOREIGN PATENT DOCUMENTS

| WO | WO-2006003485 A2 * | 1/2006 | G06F 9/451 |
| WO | WO-2007030817 A2 * | 3/2007 | G06F 3/04817 |

(Continued)

OTHER PUBLICATIONS

Wall, Emily, et al. "Podium: Ranking data using mixed-initiative visual analytics." IEEE transactions on visualization and computer graphics 24.1 (2017): 288-297. (Year: 2017).*

(Continued)

*Primary Examiner* — Matthew S Gart
*Assistant Examiner* — Derick J Holzmacher
(74) *Attorney, Agent, or Firm* — McGuire Woods LLP

(57) ABSTRACT

Techniques to provide recommended data visualizations or analytical operations are disclosed. In various embodiments, an indication is received of a set of data for which a data visualization or analytical operation is to be provided. The set of data is analyzed to determine one or more data attributes of the set of data. A data visualization or analytical method to be recommended is selected for the set of data, based at least in part on the determined one or more data attributes.

19 Claims, 14 Drawing Sheets

(56) References Cited

U.S. PATENT DOCUMENTS

| | | | | |
|---|---|---|---|---|
| 6,581,058 B1* | 6/2003 | Fayyad | G06F 16/30 | 707/737 |
| 7,921,363 B1* | 4/2011 | Hao | G06T 11/206 | 715/273 |
| 7,996,786 B2* | 8/2011 | MacLaurin | G06F 17/30554 | 715/764 |
| 8,010,909 B1* | 8/2011 | Hanson | G06F 16/26 | 715/853 |
| 8,099,674 B2* | 1/2012 | Mackinlay | G06F 16/24578 | 715/764 |
| 8,631,325 B1* | 1/2014 | Langseth | G06F 16/40 | 715/718 |
| 8,677,235 B2* | 3/2014 | Chronister | G06F 16/904 | 715/253 |
| 8,683,389 B1* | 3/2014 | Bar-Yam | G06F 3/0481 | 715/853 |
| 8,812,947 B1* | 8/2014 | Maoz | G06F 40/18 | 715/212 |
| 8,825,649 B2* | 9/2014 | Heimendinger | G06F 16/953 | 707/737 |
| 8,996,978 B2* | 3/2015 | Richstein | G06T 11/206 | 715/215 |
| 9,613,086 B1* | 4/2017 | Sherman | G06F 16/248 | |
| 2002/0188618 A1* | 12/2002 | Ma | G06K 9/6253 | |
| 2003/0018652 A1* | 1/2003 | Heckerman | G06F 16/358 | |
| 2004/0183800 A1* | 9/2004 | Peterson | G06T 11/206 | 345/440 |
| 2005/0060300 A1* | 3/2005 | Stolte | G06F 17/30554 | |
| 2006/0031187 A1* | 2/2006 | Pyrce | G06F 3/04815 | |
| 2006/0031209 A1* | 2/2006 | Ahlberg | G06F 9/4443 | |
| 2006/0206512 A1* | 9/2006 | Hanrahan | G06F 17/30554 | |
| 2007/0061611 A1* | 3/2007 | Mackinlay | G06F 16/9535 | 714/5.1 |
| 2007/0250523 A1* | 10/2007 | Beers | G06F 30/00 | |
| 2008/0005677 A1* | 1/2008 | Thompson | G06Q 10/00 | 715/744 |
| 2008/0065634 A1* | 3/2008 | Krinsky | G06F 16/9577 | |
| 2008/0297513 A1* | 12/2008 | Greenhill | G06Q 99/00 | 345/440 |
| 2009/0006319 A1* | 1/2009 | Lehtipalo | G06F 16/26 | |
| 2009/0006455 A1* | 1/2009 | Carroll | G06F 16/284 | |
| 2009/0007010 A1* | 1/2009 | Kriss | G06F 16/9038 | 715/810 |
| 2009/0013271 A1* | 1/2009 | Helfman | G06F 17/30572 | 715/764 |
| 2009/0013281 A1* | 1/2009 | Helfman | G06F 17/30572 | 715/788 |
| 2009/0013287 A1* | 1/2009 | Helfman | G06T 11/206 | 715/853 |
| 2009/0259954 A1* | 10/2009 | Chenthamarakshan | G06F 16/26 | 715/764 |
| 2009/0287673 A1* | 11/2009 | Chronister | G06F 16/904 | |
| 2009/0319891 A1* | 12/2009 | MacKinlay | G06F 3/04847 | 715/275 |
| 2010/0145715 A1* | 6/2010 | Cohen | G06Q 30/02 | 705/1.1 |
| 2010/0199181 A1* | 8/2010 | Robertson | G06Q 30/02 | 715/709 |
| 2010/0325166 A1* | 12/2010 | Rubin | G06Q 10/04 | 707/802 |
| 2011/0131250 A1* | 6/2011 | Stolte | G06F 3/04842 | 707/802 |
| 2011/0137850 A1* | 6/2011 | Mourey | G09B 29/00 | 706/54 |
| 2011/0283231 A1* | 11/2011 | Richstein | G06T 11/206 | 715/810 |
| 2011/0302194 A1* | 12/2011 | Gonzalez | G06F 16/904 | 707/769 |
| 2012/0101975 A1* | 4/2012 | Khosravy | G06Q 10/063 | 706/55 |
| 2012/0137238 A1* | 5/2012 | Abeln | G06F 3/04847 | 715/771 |
| 2012/0313949 A1* | 12/2012 | Rope | G06F 16/9038 | 345/440 |
| 2013/0097177 A1* | 4/2013 | Fan | G06F 16/221 | 707/748 |
| 2013/0103677 A1* | 4/2013 | Chakra | G06F 16/248 | 707/723 |
| 2013/0185624 A1* | 7/2013 | Appleyard | G06F 16/26 | 715/234 |
| 2014/0071138 A1* | 3/2014 | Gibson | G06T 11/206 | 345/501 |
| 2014/0165154 A1* | 6/2014 | Giblin | H04L 63/10 | 726/4 |
| 2014/0198105 A1* | 7/2014 | Gibson | G06F 16/248 | 345/440 |
| 2014/0247271 A1* | 9/2014 | Fernandez | G06F 9/451 | 345/589 |
| 2014/0330821 A1* | 11/2014 | Tullis | G06F 16/2428 | 707/728 |
| 2015/0170382 A1* | 6/2015 | Bhatia | G06T 11/20 | 345/440 |
| 2015/0278213 A1* | 10/2015 | Anand | G06F 16/24578 | 707/723 |
| 2015/0278214 A1* | 10/2015 | Anand | G06F 16/338 | 707/748 |
| 2015/0278371 A1* | 10/2015 | Anand | G06F 16/338 | 707/723 |

FOREIGN PATENT DOCUMENTS

| | | | | |
|---|---|---|---|---|
| WO | WO-2007124139 A2 * | 11/2007 | | G06F 16/283 |
| WO | WO-2009139970 A2 * | 11/2009 | | G06F 16/904 |

OTHER PUBLICATIONS

Gorodov, Evgeniy Yur'evich, and Vasiliy Vasil'evich Gubarev. "Analytical review of data visualization methods in application to big data." Journal of Electrical and Computer Engineering 2013 (2013). (Year: 2013).*

Luo, Yuyu, et al. "Deepeye: Towards automatic data visualization." 2018 IEEE 34th international conference on data engineering (ICDE). IEEE, 2018. (Year: 2018).*

Saket, Bahador, and Alex Endert. "Demonstrational interaction for data visualization." IEEE computer graphics and applications 39.3 (2019): 67-72. (Year: 2019).*

Author Unknown, Eureqa Enterprise, Nuntonian Inc., 2013.

Author Unknown, Eureqa is a New Technology that Uncovers and Explains the Intrinsic Relationships Hidden Deep Within Data, Eureqa Enterprise, Nuntonian Inc., 2013.

Author Unknown, Rio Tinto, Fer Et Titane Unearths a Critical Production Factor and Maintains Product Quality with the Help of Eureqa, Nuntonian Inc., 2013.

* cited by examiner

600

| Data | Visualization |
|---|---|
| #, location | map |
| #, #, location<br>#, #, category | scatter plot |
| #, category, location | grid of maps |
| many categories | tree map |
| category, number of numerical columns | parallel coordinate plot |
| #, date or time | line chart |

FIG. 6

CONTEXT AWARE RECOMMENDATION OF ANALYTIC COMPONENTS

CROSS REFERENCE TO OTHER APPLICATIONS

This application claims priority to U.S. Provisional Patent Application No. 62/073,229 entitled CONTEXT AWARE RECOMMENDATION OF ANALYTIC COMPONENTS filed Oct. 31, 2014 which is incorporated herein by reference for all purposes.

BACKGROUND OF THE INVENTION

Many companies are limited in their ability to utilize visual analytics for business optimization due to lack of skilled analysts. In many cases the companies have a few skilled analysts, but not enough to fully take advantage of visual analytics in order to optimize their business processes and decisions.

Creating information dashboards in the business intelligence industry is a time consuming and tedious task, often requiring specific skills.

Often, it is users that know the business that need to make decisions based on visual analytics, but since there is a shortage of skilled analysts to create the information dashboards required for the business users to understand the information, decisions may be made without proper analysis of available data.

BRIEF DESCRIPTION OF THE DRAWINGS

Various embodiments of the invention are disclosed in the following detailed description and the accompanying drawings.

FIG. 6 is a block diagram illustrating an example of a data structure to map data attributes to data visualization types in an embodiment of a data analytics system.

DETAILED DESCRIPTION

Figure 1:
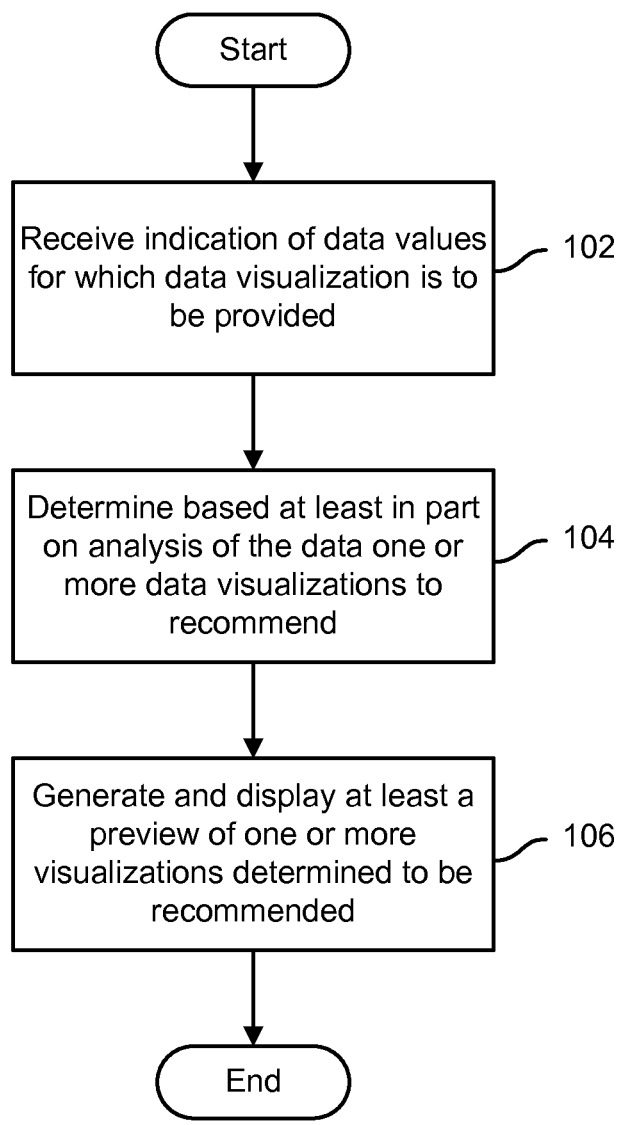
FIG. 1 is a flow chart illustrating an embodiment of a process to generate data analytics components.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A solution that enables non-analysts to make use of visual analytics for ad hoc data exploration and information dashboard creation is disclosed. In various embodiments, business users are provided with context aware recommendations of analytic components, such as visualizations, analytic and statistical methods, etc. In various embodiments, business users who are not data analysts are enabled to create independently the information dashboards they require to make data-driven decisions.

In various embodiments, context aware recommendations for analytic components may be made through the systematic application of one or more recommendation algorithms based on data profiling, good visualization practices, prepared and in some embodiments market specific analytic templates or data source specific templates, and feedback through crowdsourcing. A number of visualizations may be created to present views of the same data from multiple angles.

Examples of algorithms that may be used, in various embodiments, to determine analytics tools (e.g., visualizations and analytical methods) to be recommended include, without limitation, heuristic analysis of data properties, e.g., data types, column names, number of unique values, hierarchical relationship between columns (if any), and the data distribution.

In various embodiments, recommendations may be refined based on additional input, including the user's endorsement of a recommended or otherwise displayed visualization, or the knowledge the user displays in working with a visualization. For example, a user may endorse a visualization implicitly, such as by selecting or otherwise interacting with the visualization, or explicitly, such as in reply to a prompt to rate the visualization or providing other explicit user input to endorse the visualization. Other indications may include a user selected a recommended visualizations to be saved as a template, or machine observation of modifications a user makes to a recommended visualization.

In some embodiments, a context aware tool is provided to help non-analyst users to re-use and repurpose domain specific analytical assets created by others. Based on the user's context in terms of the data and the state of the user interface, the user's previous actions, and the user's colleagues' previous actions, the algorithm suggests and promotes candidate analytical assets and tools. In a given context, the user will receive recommendations about what analytical tools he may use, and the user is able to apply the recommendation with a simple operation, e.g., a simple selection of a displayed alternative.

FIG. 1 is a flow chart illustrating an embodiment of a process to generate data analytics components. In various embodiments, the process of FIG. 1 may be performed by a computer programmed to perform the process of FIG. 1. The computer may comprise a data analytics platform configured to enable a business analyst or other non-programmer to create a business data analytics dashboard comprising data visualizations, including visualizations determined, generated, and/or recommended as disclosed herein. In the example shown, an indication is received, e.g., via a displayed graphical user interface, of data values for which a data visualization or other analytical operation and/or component is to be provided (102). For example, in some embodiments, a user interface may be displayed that enables a user to select a data source, e.g., a database or other data file. Columns and/or other named data attributes may be displayed, and the business analyst or other user may select one or more columns of data to be represented in the visualization. One or more data visualizations to be recommended are determined based at least in part on an analysis of the data indicated to be included in the visualization (104). For example, one or more of the data type (e.g., text, integer, etc.), column names, number of unique values, attributes of data values in a column, distribution or other statistical analysis of data values in a column, etc. may be used to determine one or more visualizations to be recommended. In some embodiments, data visualization evaluation criteria may be applied to select visualizations to be recommended. At least a preview of one or more visualizations determined to be recommended is generated and displayed (106). In some embodiments, a preview may be displayed in an interactive user interface that enables a user to select and refine or otherwise modify the recommended visualizations, e.g., by adjusting display and/or other parameters.

In some embodiments, an analytical method other than and/or in addition to a visualization may be recommended. For example, in some embodiments techniques disclosed herein may be used to recommend based on an analysis of data values in a data column that a count of unique values in the data column should be presented and/or otherwise used, rather than their sum, or a determination and/or recommendation may be made to apply k-means clustering or principal component analysis to data in one or more selected columns. In some embodiments, a market or a company specific calculation may be determined or recommended to be applied, based on an analysis of the data.

Figure 2:
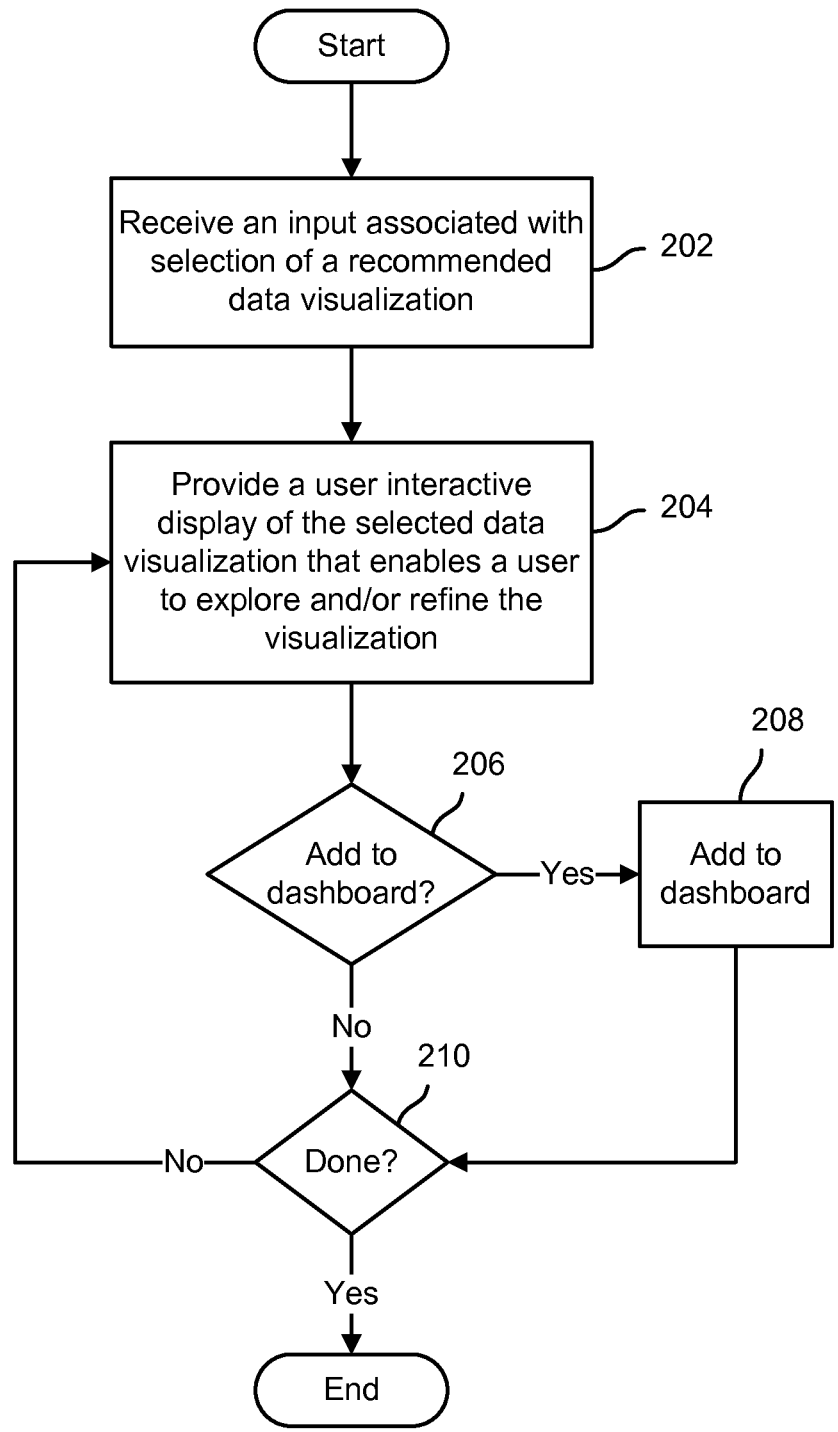
FIG. 2 is a flow chart illustrating an embodiment of a process to build a data analytics dashboard.

FIG. 2 is a flow chart illustrating an embodiment of a process to build a data analytics dashboard. In various embodiments, the process of FIG. 2 may be performed by a computer programmed to perform the process of FIG. 2. The computer may comprise a data analytics platform configured to enable a business analyst or other non-programmer to create a business data analytics dashboard comprising data visualizations, including visualizations determined, generated, and/or recommended as disclosed herein. In the example shown, an input associated with selection of a recommended data visualization is received (202). For example, a selection may be made by a business analyst or other user via a user interface in which a preview or other representation of a recommended visualization is displayed. The user is provided with an interactive display of the selected visualization, e.g., in a graphical user interface, which enables the user to explore and/or refine the visualization (204). For example, in various embodiments, the axis or other labels may be modified, colors used to distinguish between different data subsets and/or values may be changed, scale and/or data value range values may be adjusted, etc. If an indication is received to add a selected data visualization to a dashboard (206), the indicated visualization is added to the dashboard (208). For example, in some embodiments a user interface may be provided to enable a business analyst or other user to refine a recommended visualization, if desired. A button or other control may be added to enable the user to select the (optionally refined) visualization to be included in a business analytics dashboard the user is building, e.g., using tool with which the data visualization recommendation interface is associated. The process of FIG. 2 continues until the user indicates the user is done (210), e.g., by closing the interactive user interface in which the data visualization recommendations are displayed.

Figure 3:
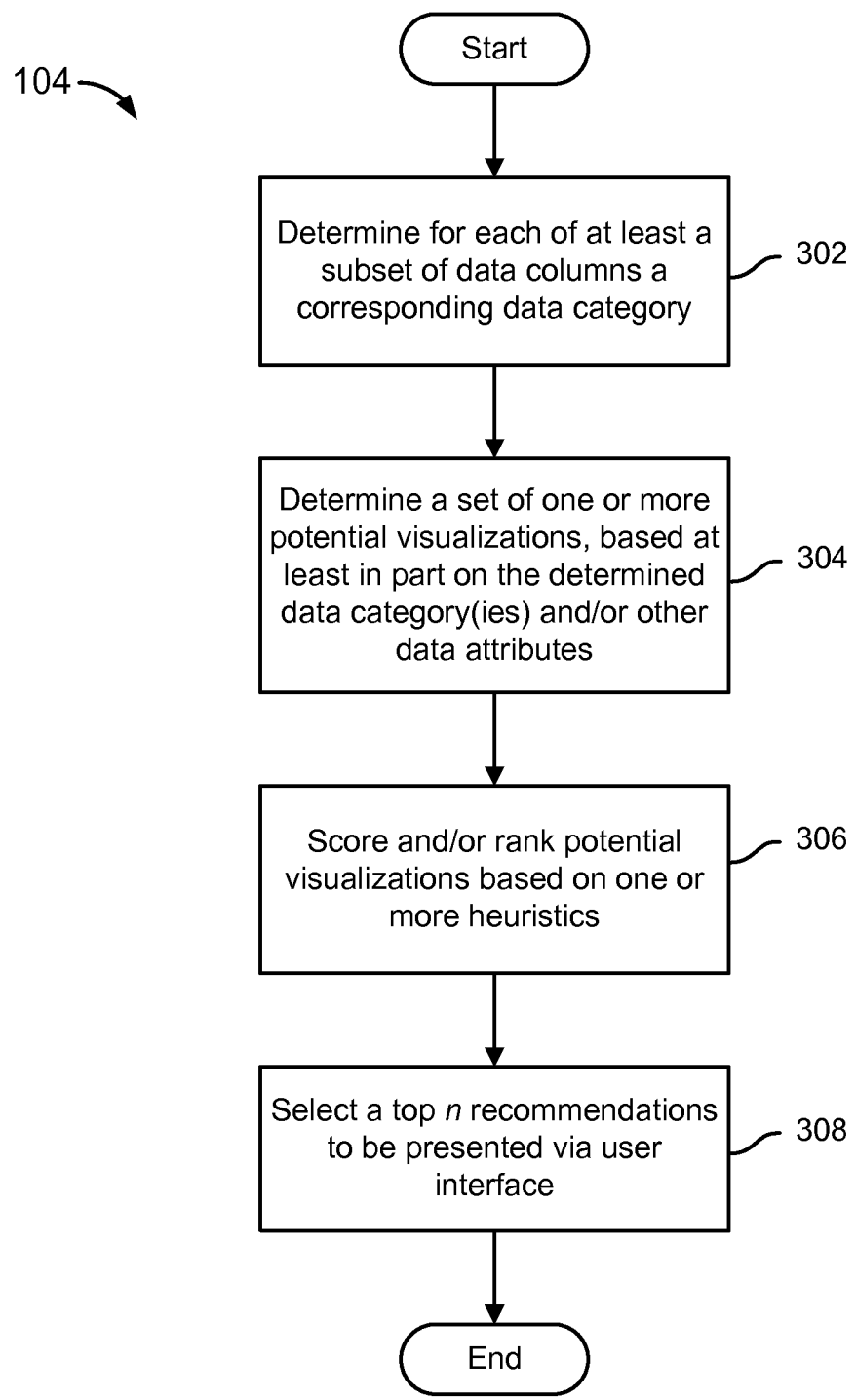
FIG. 3 is a flow chart illustrating an embodiment of a process to determine data visualization components to recommend.

FIG. 3 is a flow chart illustrating an embodiment of a process to determine data visualization components to recommend. In various embodiments, step 104 of the process of FIG. 1 may be implemented at least in part by configuring a data analytics system or other computer to perform the process of FIG. 3. In the example shown, for each of at least a subset of data columns to be included in the data visualization a corresponding data category or other classification and/or characterization is determined (302). For example, a column may be determined based on a data type (e.g., text) and/or values (e.g., specific words found in a domain specific dictionary) to be associated with a specifically determined category (e.g., locations) and/or to be a "category" of some type. A data column in which each value is unique may be categorized as a "unique identifier". A data column in which the data values are apparently arbitrarily distributed values may be categorized as a "number". A data column in which the data can be interpreted as time may be categorized as "time". In various embodiments, one or more other and/or additional attributes of the data comprising each of at least a subset of columns may be determined. In some embodiments, a user may be provided a user interface or other mechanism to indicate explicitly a category or type for a column. For example, a user may indicate explicitly that a column container numbers should be treated as an "identifier".

A set of one or more potential visualizations is determined based at least in part on the determined data categories and/or other data attributes (304). For example, one or more visualization types may be filtered out or otherwise excluded from the set, based for example in incompatibility of the visualization type with the combination of data categories and/or other attributes of the data to be represented in the visualization. Conversely, in some embodiments data visualization types, templates, etc. may be selected into the set based on a determination that the data categories and/or other attributes of the data to be included in the visualization match selection criteria, tags, and/or other metadata associated with such data visualization types, templates, etc. Potential visualizations are scored and/or ranked based on one or more heuristics and/or other evaluation criteria (306). For example, a degree of match or fit between each potential visualization and the data to be represented may be determined. In some embodiments, preferences of the user, past choices of the user, crowd source information, or other contextual information may be used to select and rank potential visualization. A top "n" visualization types (e.g., four) are selected to be recommended and/or recommended first, e.g., via a user interface (308). For each visualization type the best suited visualization is presented as the recommended visualization at the top level. In some embodiments, each recommendation is displayed as a preview and each may include a "more like this" button or other control to request that additional recommendations that are variants of and/or otherwise related to the associated recommended visualization be generated and displayed.

Figure 4:
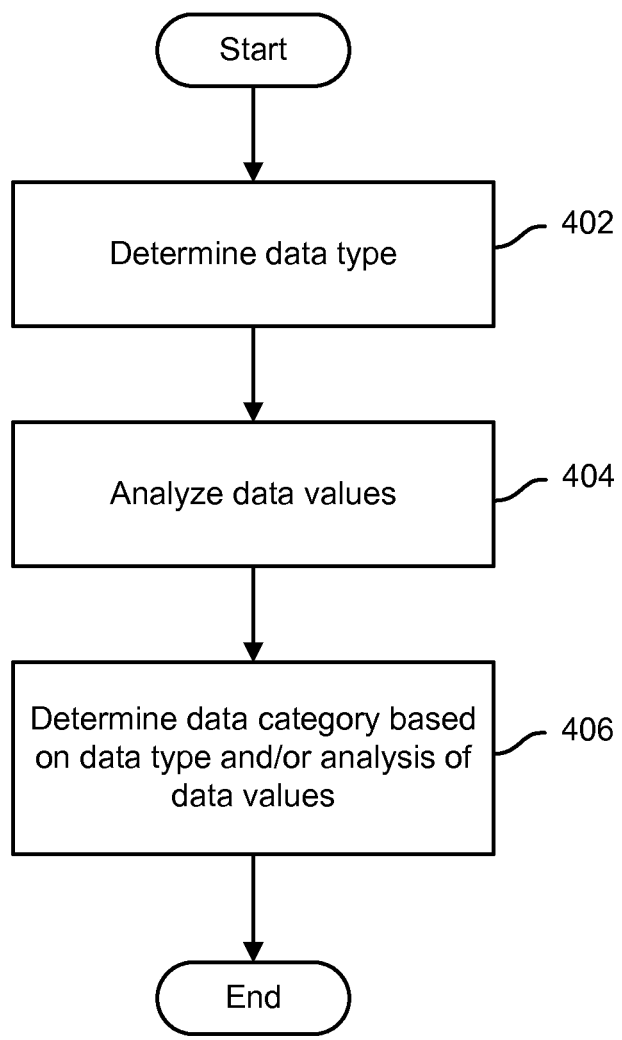
FIG. 4 is a flow chart illustrating an embodiment of a process to determine data attributes.

FIG. 4 is a flow chart illustrating an embodiment of a process to determine data attributes. In various embodiments, step 302 of the process of FIG. 3 may be implemented at least in part by configuring a data analytics system or other computer to perform the process of FIG. 4. In the example shown, a data type associated with a column is determined (402). Examples of data type may include, without limitation, one or more of an integer or other numeric type, a string, text, date, time etc. Data values in the column (or other subset) may be analyzed (404). For example, a number of unique values may be determined. Values may be compared to a dictionary or other lexicon. For example, a dictionary of place names may be used to classify a column as containing "location" data. Statistical methods may be used to determine a distribution or other characteristics of the column of other data set. A data category is determined based on the determined data type and/or other determined data characteristics (406). Examples of data classification may include, without limitation, "number", "location", "category", "date", and "time".

In various embodiments, the respective "categories" determined for the columns (or other sets of values) to be included in a visualization may be used to determine (or exclude) one or more candidate visualizations. In some embodiments, the categories of the respective columns may be evaluated together to determine a candidate visualization.

Figure 5:
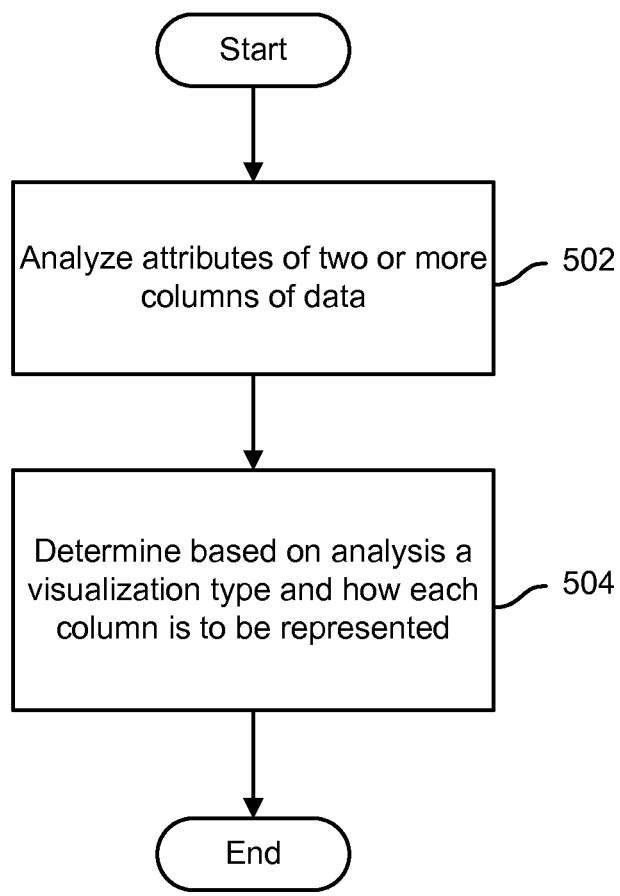
FIG. 5 is a flow chart illustrating an embodiment of a process to determine a data visualization based on data attributes.

FIG. 5 is a flow chart illustrating an embodiment of a process to determine a data visualization based on data attributes. In various embodiments, the process of FIG. 5 may be performed by a data analytics system, module, component, etc., when two or more columns have been selected to be included in a visualization. In the example shown, the attributes of two or more columns of data are analyzed (502). For example, the respective categories, distributions, numbers of unique values, etc. may be analyzed. A visualization type, and how each column or other set of values is to be represented (at least initially) in the visualization, is determined based at least in part on the analysis of the respective data attributes of the data to be represented in the visualization (504).

For example, if a bar chart is recommended and a selected column has relatively few unique values each may be represented by a bar. Conversely, if there are many unique values the values may be sorted into bins and each bin may be represented by bar reflecting a number of records (e.g., rows) having values in that bin. Similarly, each unique value may be represented as a different color in a scatter plot or density plot, for example; but a different way of representing the column may be selected programmatically if the number of unique values is high.

FIG. 6 is a block diagram illustrating an example of a data structure to map data attributes to data visualization types in an embodiment of a data analytics system. In the example shown, table 600 includes a first (left) column in which data attributes are listed, and a second (right) column in which for each set of data attributes in the first column a corresponding preferred visualization type is listed. In various embodiments, a data structure such as table 600 may be used to determine a suitable and/or preferred type of visualization based on determined attributes of data to be represented in the visualization. In some embodiments, the table 600 may be implemented as a set of heuristics or other rules, hard-coded or otherwise implemented as software, etc. In the example shown, if two columns have been selected and the first is classified as a set of numbers and the second as location data, a map-based visualization is indicated as the preferred visualization. If three columns are selected, two comprising numbers and the third either locations or a text-based category (e.g., product names, division, etc.), a scatter plot is indicated as a preferred visualization. If three columns classified as a number, category, and location have been selected, a grid of map-based visualizations may be used, each location in the grid corresponding to a category and containing a map on which the number values are represented by corresponding location. A set of columns comprising many categories may result in a tree map visualization being used. Finally, if a number of values must be represented for each row of data a parallel coordinate plot would be preferred in this example. If a number columns and date or time column is chosen a line chart may be recommended as the preferred visualization type.

Figure 7A:
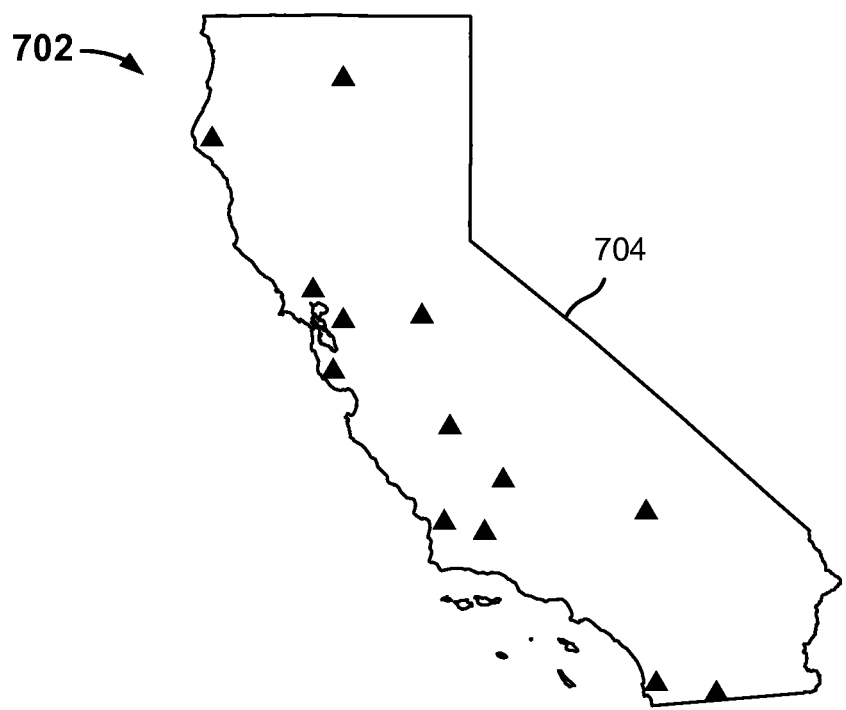
FIG. 7A is a block diagram illustrating an example of a map-based data visualization in an embodiment of a data analytics system.

FIG. 7A is a block diagram illustrating an example of a map-based data visualization in an embodiment of a data analytics system. In some embodiments, a visualization such as the one shown in FIG. 7A may be selected programmatically to be recommended to provide a visualization of a single column classified as a set of locations. In the example shown, visualization 702 includes a map 704, in this example the State of California, on which triangles have been plotted to represent locations, e.g., cities, street addresses, etc., comprising data values in the column.

Figure 7B:
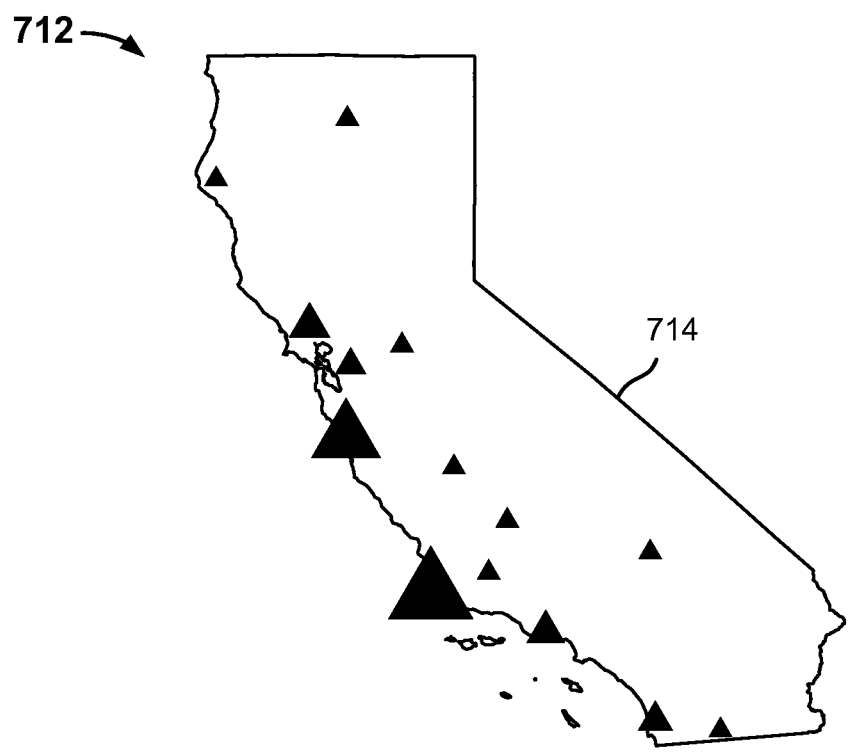
FIG. 7B is a block diagram illustrating an example of a map-based data visualization in an embodiment of a data analytics system.

FIG. 7B is a block diagram illustrating an example of a map-based data visualization in an embodiment of a data analytics system. In the example shown in FIG. 7B, a first column may have been classified as a number and a second column as a set of locations within California, resulting in the visualization 712 having been selected programmatically to be recommended. In this example, visualization 712 includes a map outline 714 on which triangles of varying sizes reflecting an associated value in the "number" column have been plotted on corresponding locations on map 714 based on the corresponding values in the "location" column.

Figure 7C:
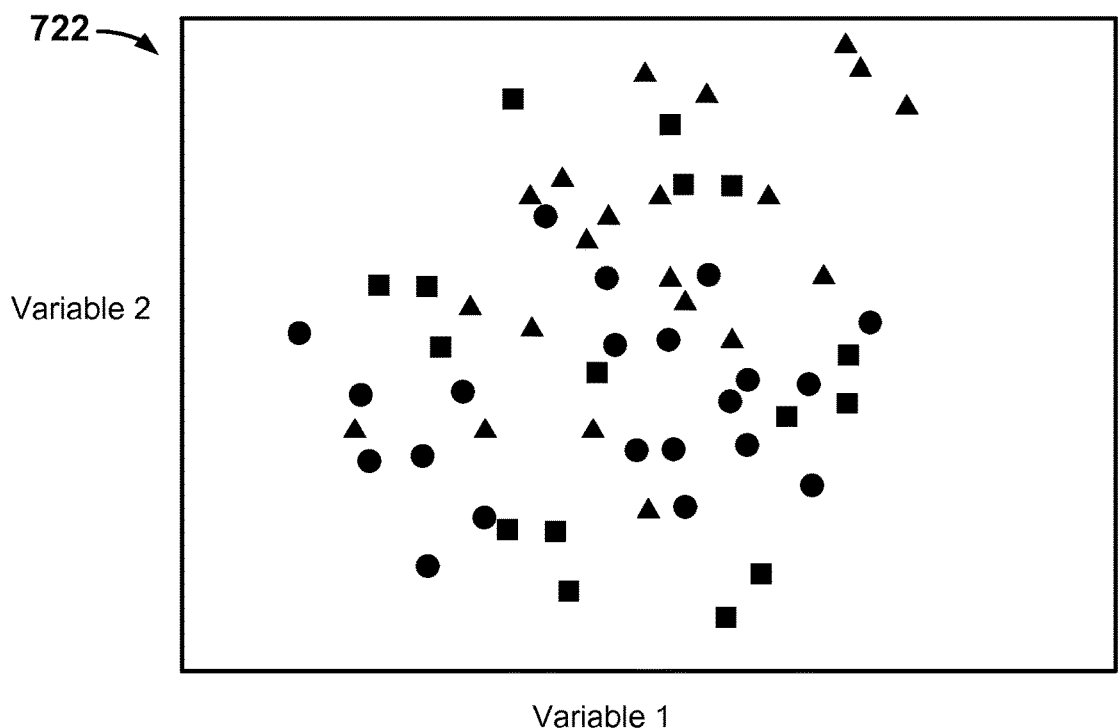
FIG. 7C is a block diagram illustrating an example of a scatter plot type data visualization in an embodiment of a data analytics system.

FIG. 7C is a block diagram illustrating an example of a scatter plot type data visualization in an embodiment of a data analytics system. In the example shown, two columns each classified as containing a set of "number" values may have been determined programmatically to each include a distribution of values such that a scatter plot such as scatter plot 722 of FIG. 7C was selected programmatically to be recommended to represent the data. A third column may have been determined to comprise a "category" type column having relatively few unique values, resulting in the respective categories being determined programmatically to be represented in scatter plot 722 as different shapes (or colors, etc.), such as the triangle, circle, and square shapes shown.

Figure 7D:
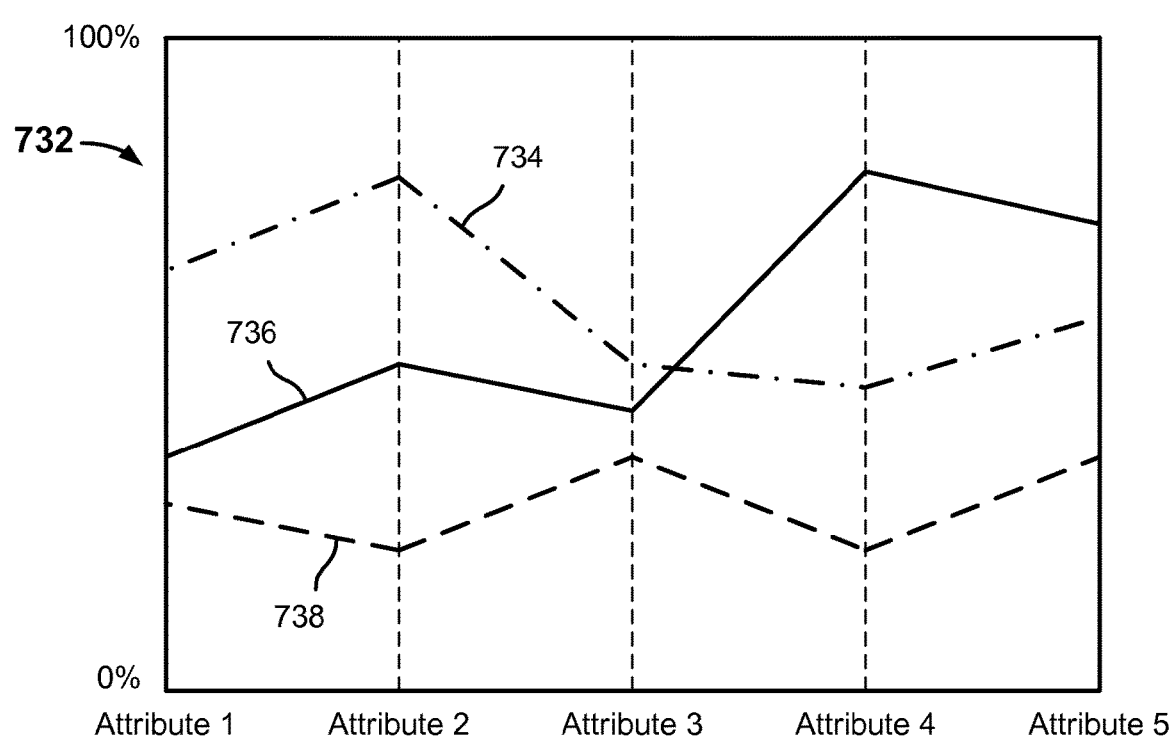
FIG. 7D is a block diagram illustrating an example of a parallel coordinate plot type data visualization in an embodiment of a data analytics system.

FIG. 7D is a block diagram illustrating an example of a parallel coordinate plot type data visualization in an embodiment of a data analytics system. In the example shown, in parallel coordinate plot visualization 732 for each set of data, e.g., each row, respective data values for each of five attributes (columns) are plotted. The data values in each row are joined by corresponding lines 734, 736, and 738, respectively, enable similar and dissimilar sets of values to be identified, for example. In this example, the values in the respective columns have been normalized, e.g., represented as a percentage of a maximum value in the column, or a percentage along a range from the minimum value to the maximum value, etc., to enable numbers of dissimilar magnitude, units, range, etc. to be displayed in the same visualization. In some embodiments, a visualization such as parallel coordinate plot visualization 732 may be selected programmatically to be recommended based on the number of "number" type columns selected to be displayed and/or the number of rows to be displayed, etc.

Figure 7E:
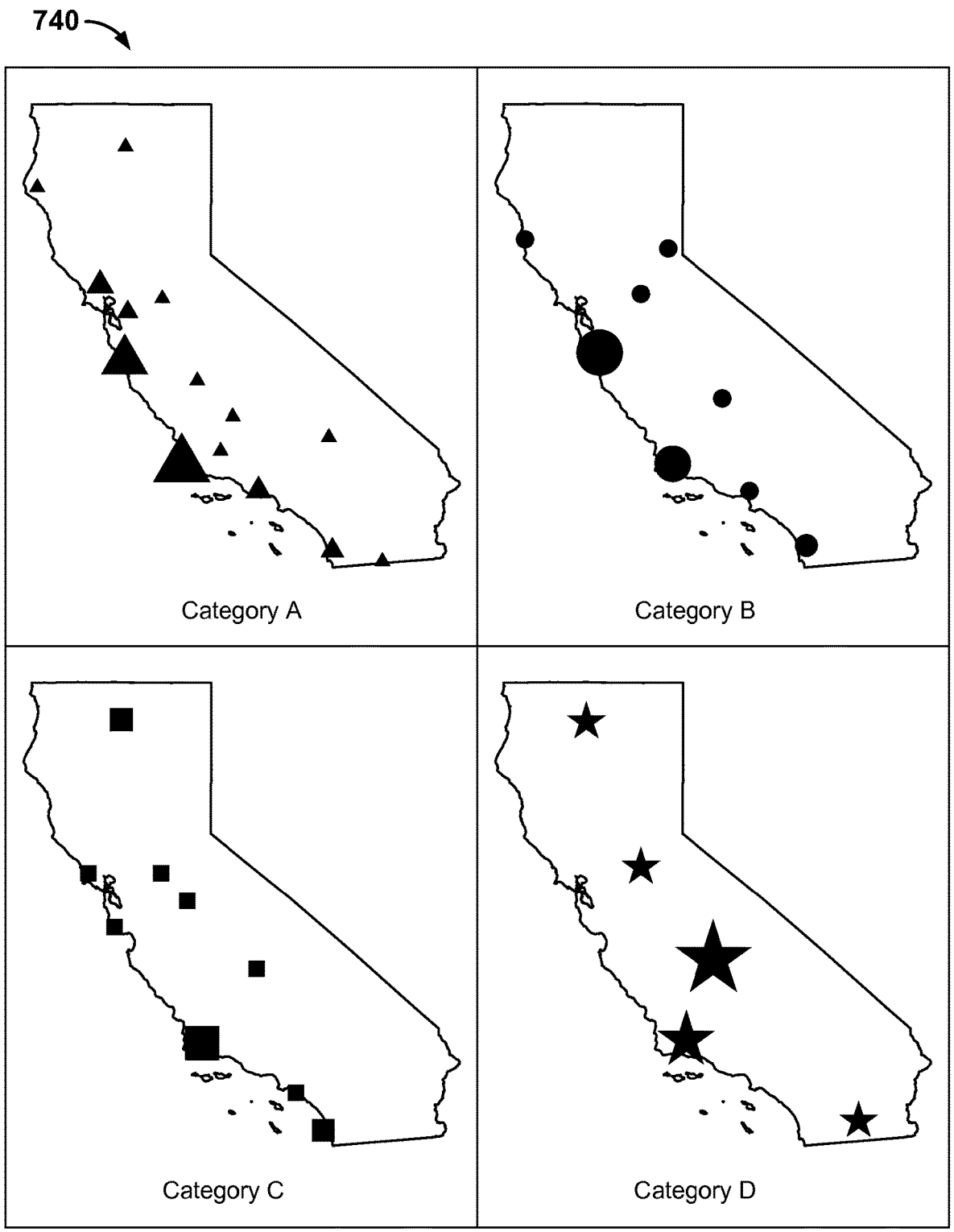
FIG. 7E is a block diagram illustrating an example of a map-based data visualization by category in an embodiment of a data analytics system.

FIG. 7E is a block diagram illustrating an example of a map-based data visualization by category in an embodiment of a data analytics system. In the example shown, map-based visualization 740 includes a grid of map-based visualization in which each location in the grid corresponds to a category and for each category a map-based visualization of location and number data is represented, as in the example shown in FIG. 7B. In some embodiments, a grid of map-based visualizations such as the example shown in FIG. 7E may be selected programmatically to be recommended based, for example, on determined attributes of the data to be represented, e.g., based on a determination that three selected columns contain numbers, locations, and categories, respectively, and the category column contains a relatively small number of unique values.

Figure 7F:
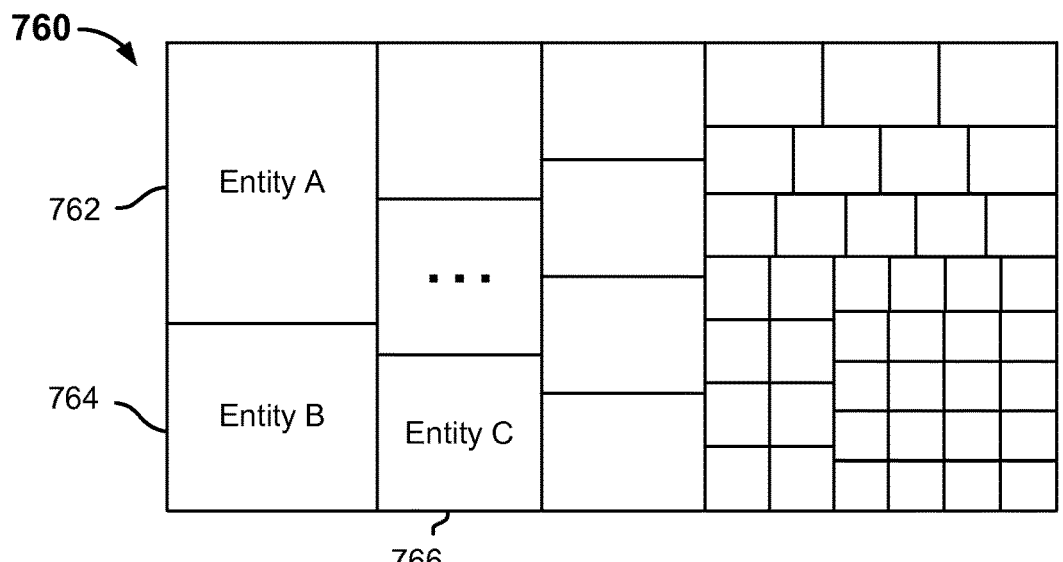
FIG. 7F is a block diagram illustrating an example of a tree map type data visualization in an embodiment of a data analytics system.

FIG. 7F is a block diagram illustrating an example of a tree map type data visualization in an embodiment of a data analytics system. In some embodiments, a visualization such as tree map 760 may be selected programmatically to be recommended based on a determination that a large number of categorical columns are required to be represented. Each category may be represented, for example as a different color or other fill in the tree map 760, with the size of each rectangle, the shade or intensity of a common color, etc., being determined by a corresponding number value associated with that category. For example, rectangles 762, 764, and 766 in the example shown each may represent a corresponding category. If an additional "category" or "location" type column had been selected, a grid of tree maps may be selected programmatically to be recommended.

Figure 8A:
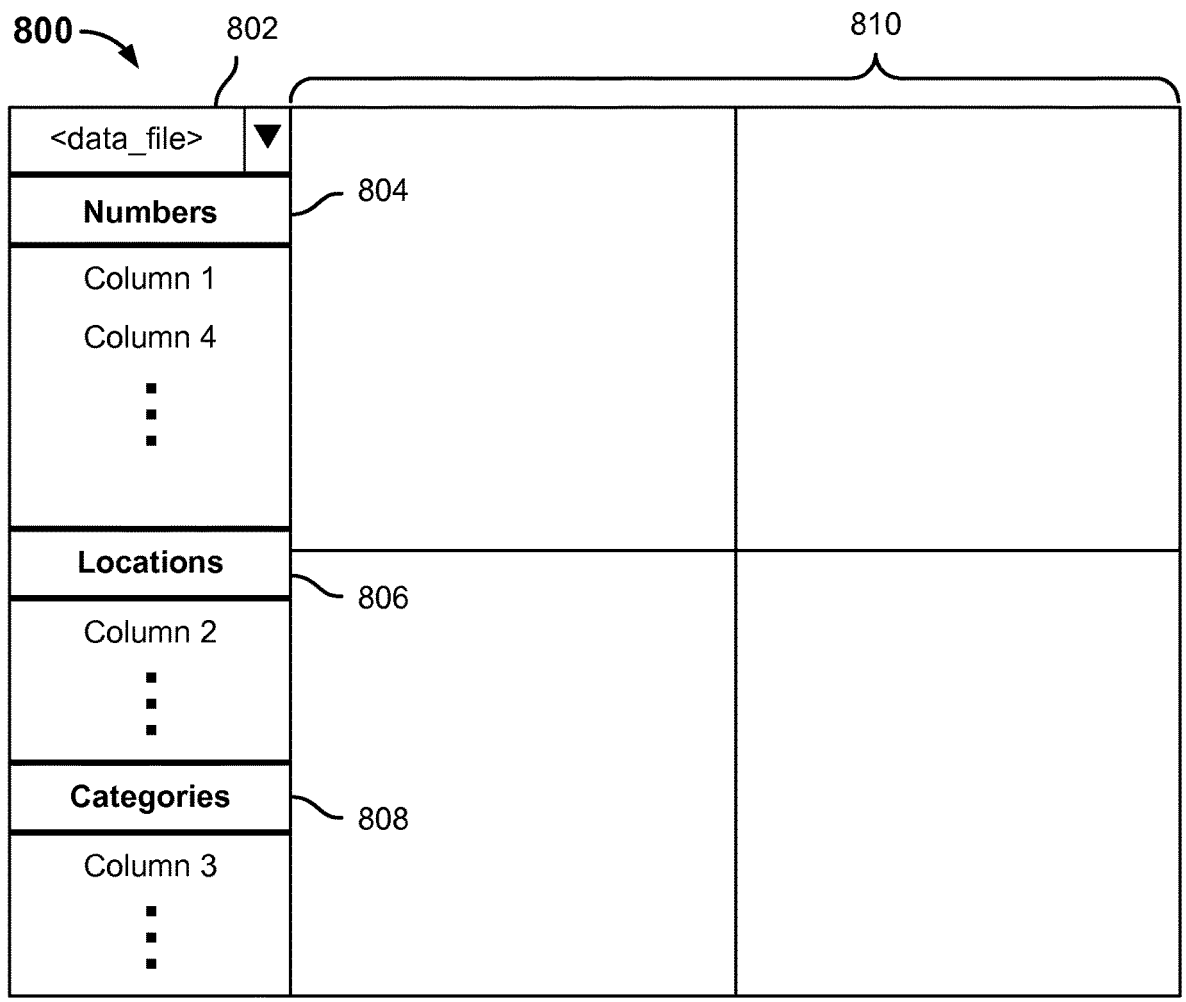
FIG. 8A is a block diagram illustrating an embodiment of a data visualization user interface in an embodiment of a data analytics system.

FIG. 8A is a block diagram illustrating an embodiment of a data visualization user interface in an embodiment of a data analytics system. In the example shown, user interface 800 includes a data input selection field and control 802, in this example a drop down menu, to enable a user to select a database or other data file and to display the currently-selected file. In additions, columns comprising the selected data file have been classified and grouped by classification as comprising "numbers" 804, "locations" 806, or "categories" 808. In various embodiments, selection of columns (e.g., Column 1, Column 2, etc. in the example shown) results in backend code being invoked to determine recommended visualizations, as disclosed herein, previews and/or other representations of which are displayed in a recommended visualizations display grid area 810 of user interface 800.

Figure 8B:
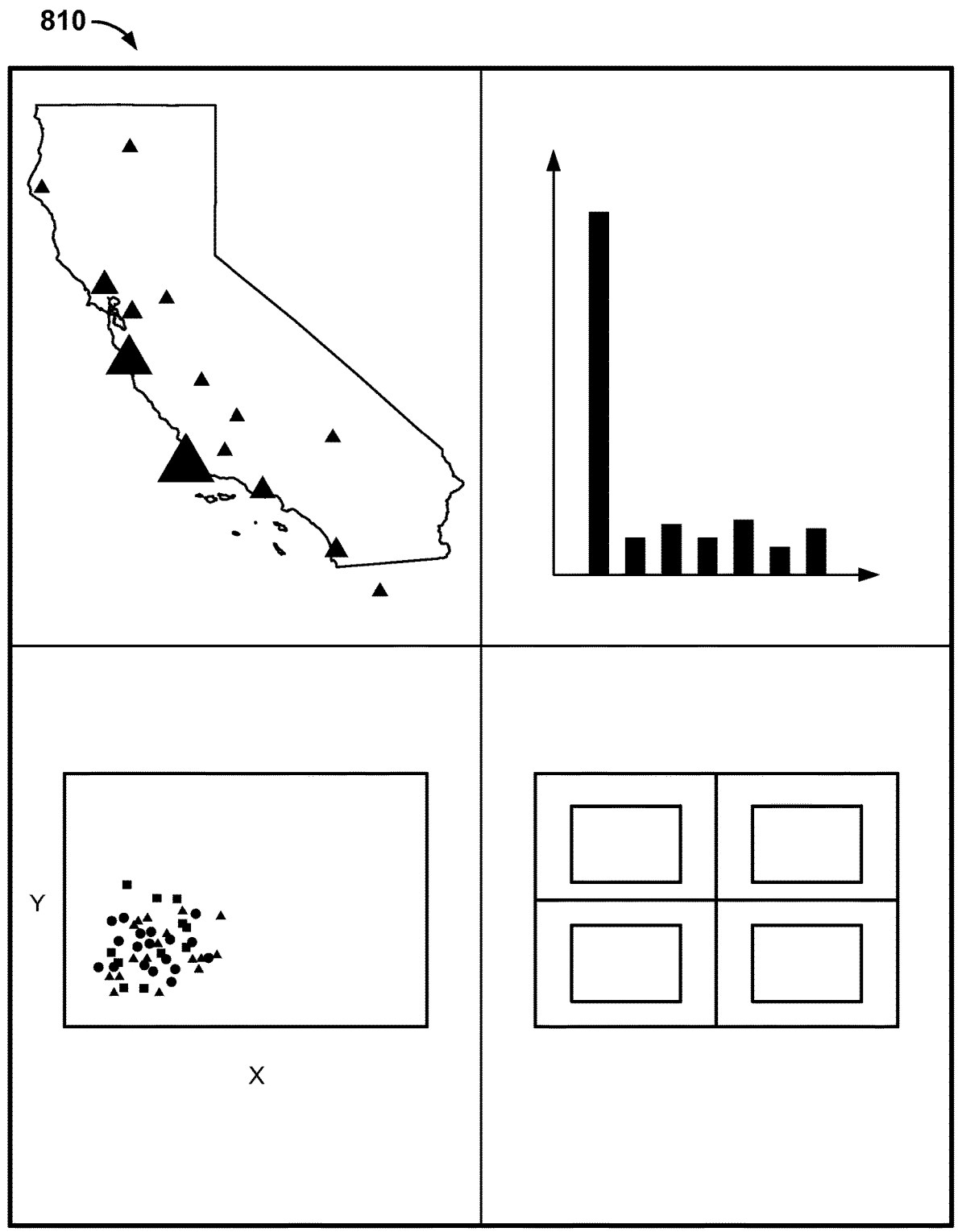
FIG. 8B is a block diagram illustrating an embodiment of a portion of a data visualization user interface in an embodiment of a data analytics system.

FIG. 8B is a block diagram illustrating an embodiment of a portion of a data visualization user interface in an embodiment of a data analytics system. In the example shown, recommended visualizations display grid area 810 of user interface 800 is shown to include a display of four recommended visualizations. For example, in response to the selection of one or more columns of data, the data analytics system in some embodiments may have analyzed the data columns to be represented, determined that the four visualizations shown in FIG. 8B were to be recommended, and generated and displayed the previews shown in FIG. 8B. In various embodiments, more or fewer recommendations may be generated and displayed, depending on the data columns selected, etc. In various embodiments, selection of a preview of a recommended visualization may result in the selected visualization being displayed in an interactive user interface, e.g., one that enables a user to manipulate and refined the visualization. In various embodiments, for each recommended visualization controls to reject and dismiss the recommendation, to obtain "more like this" (i.e., more recommendations of that type of visualization), and/or to add the recommended visualization to a dashboard being defined by the user may be displaced.

In various embodiments, recommended visualizations may be ranked according to a degree of fit with the data to be represented. The degree of fit may be determined at least in part by applying one or more of a heuristic, a scoring or other ranking algorithm, and a set of one or more rules. More highly ranked recommendations may be assigned priority placement in a display of recommended visualizations, such as the recommended visualizations display grid area 810 of FIGS. 8A and 8B. For example, a most highly ranked recommendation may be shown in the upper left, a next ranked recommendation in the upper right, etc.

In some embodiments, selection of two numerical columns (e.g., price and price change) may result in scatter plot and/or density plot type visualizations being prioritized over other representations, such as bar charts or line charts. Selecting a numerical column (e.g., price change) and a location column (e.g., state) may result in map-based visualizations being prioritized over other types of visualization, such as bar charts or tables. Selecting several numerical columns and one or no categorical columns may prioritize parallel coordinate plots over other plot types. In various embodiments, heuristics, distance or other fit functions, logic, and/or rules may be applied to assign relative priorities to visualizations that have been determined to be presented as recommended visualizations for a given set of data, such as a set of columns selected by a user via a user interface such as the examples shown in FIGS. 8A and 8B.

In various embodiments, recommended visualizations may be determined and provided as disclosed herein by a standalone system, product, or service, and/or as a component of a business or other data analytics solution and/or tool.

Figure 9:
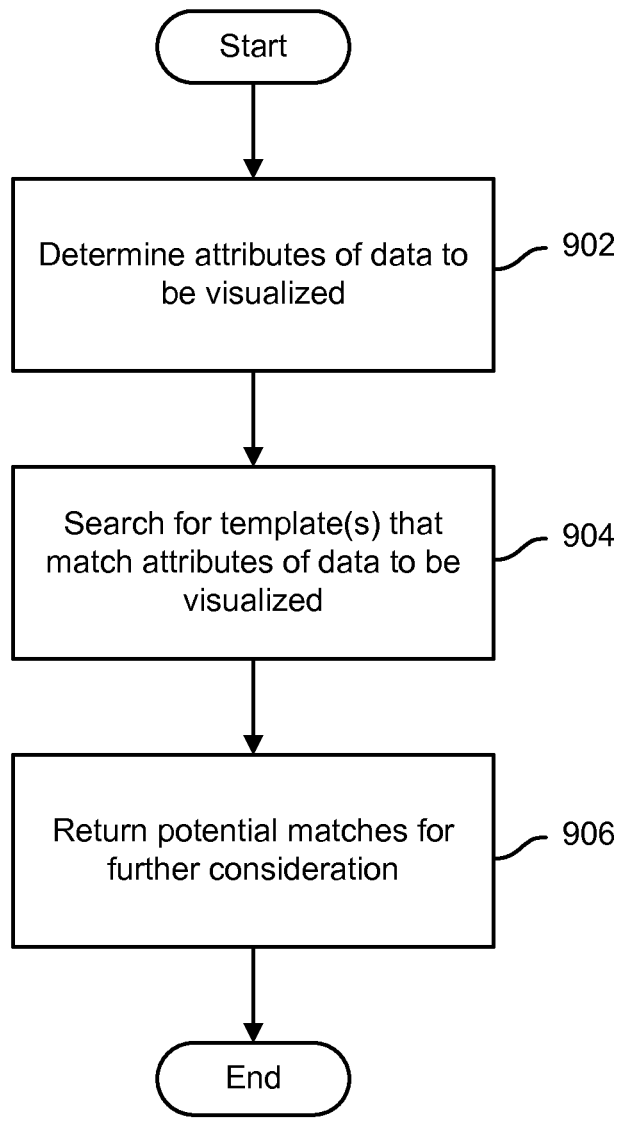
FIG. 9 is a flow chart illustrating an embodiment of a process to determine a data visualization recommendation based on a template.

FIG. 9 is a flow chart illustrating an embodiment of a process to determine a data visualization recommendation based on a template. In various embodiments, the process of FIG. 9 may be implemented by a data analytics system, module, component, etc. In the example shown, attributes of data to be visualized are determined (902). For example, selected data columns may be classified (e.g., as comprising "number", "location", and/or "category" data) and/or data values contained in the respective columns may be analyzed (data type, number of unique values, distribution, etc.). A search to find one or more templates that match the determined attributes is performed (904). For example, templates having matching or nearly matching attributes associated therewith may be determined. An attribute vector determined for the data to be represented may be compared programmatically to corresponding values associated with each of a plurality of templates, and templates found (e.g. based on a distance measure, projection, etc.) to be similar to the attribute vector for the data to be represented may be identified. Templates determined to match the attributes of the data to be represented are returned for further consideration (906).

Figure 10:
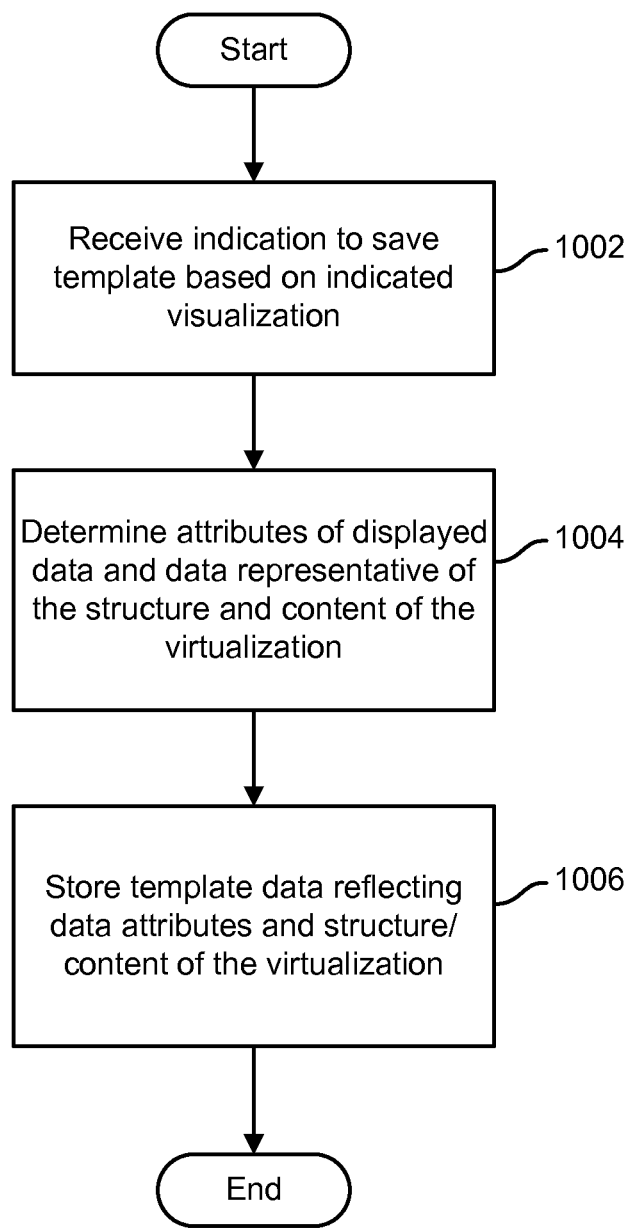
FIG. 10 is a flow chart illustrating an embodiment of a process to create a data visualization template.

FIG. 10 is a flow chart illustrating an embodiment of a process to create a data visualization template. In various embodiments, the process of FIG. 10 may be implemented by a data analytics system, module, component, etc. In the example shown, an indication is received to save a template based on a currently active data visualization (1002). For example, a user may have created a data visualization as disclosed herein, e.g., by refining a recommended visualization, and may indicate that the current visualization should be saved as a template, e.g. for future use by that user and/or others. Attributes of the currently displayed visualization and data representative of the structure and content of the current visualization are determined (1004). A template reflecting the determined data attributes and the structure/content of the current visualization is stored (1006).

Figure 11:
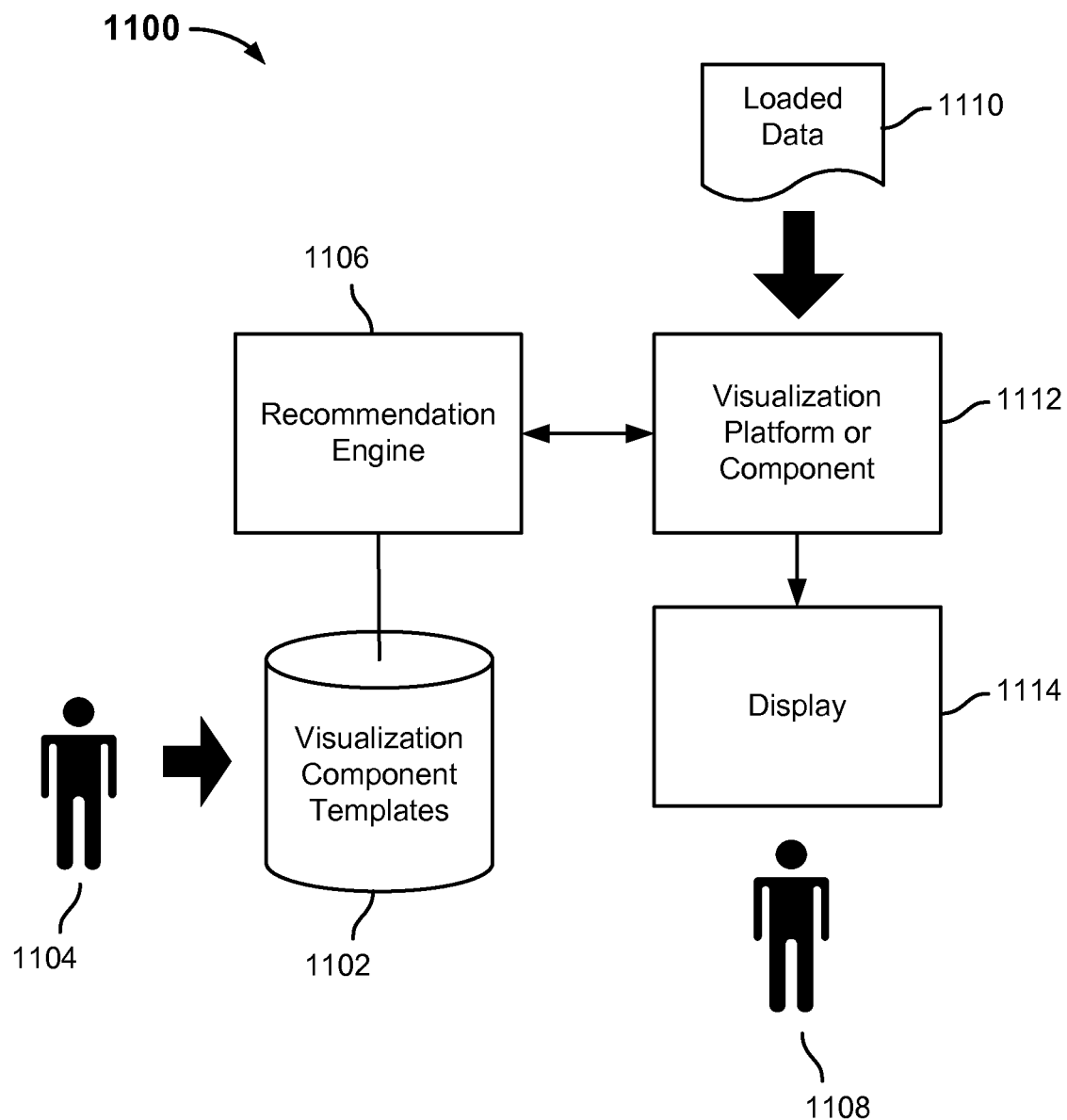
FIG. 11 is a block diagram illustrating an embodiment of a system to recommend data visualizations based on templates.

FIG. 11 is a block diagram illustrating an embodiment of a system to recommend data visualizations based on templates. In the example shown, system 1100 includes a stored and indexed set of visualization component templates 1102 each contributed by a contributor 1104. The templates 1102 and associated index and/or other metadata are available to a recommendation engine 1106 configured to determine recommended templates based on data attributes received from a visualization platform or component 1112. A user 1108 selects data 1110 to be loaded into visualization platform or component 1112, which in turn is configured to determine data attributes of the data 1110, e.g., as disclosed herein, and to provide the data attributes to recommendation engine 1106 to search for corresponding templates. In some embodiments, a browser-type user interface may be provided to enable a user to browse templates. Templates returned by recommendations engine 1106 and/or otherwise selected may be used to generate and display via display 1114 a preview or other representation of a visualization of data 1110 that is based on a template returned by recommendation engine 1106, for example.

Using techniques disclosed herein, data visualizations may be determined, generated, and recommended for inclusion in a dashboard all through automated processing of data selected by a business analyst or other user lacking the specific technical skills that would otherwise be required to generate such a dashboard.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method of operating a visualization platform to create context aware recommendations for analytic components, comprising:
   storing data sets for database columns, rules for at least one database column and associated data set, associated data set attributes, and recommendations from users for at least one visualization type and at least one user-altered visualization type;
   the rules for determining the at least one visualization type and the at least one user-altered visualization type, priorities relative to the at least one visualization type and the at least one user-altered visualization type, at least one analytic method type, and at least one filtering operation for the at least one database column;
   the at least one visualization type and the at least one user-altered visualization type determined based on the associated data set attributes and at least one of selected from a group comprising the priorities and the analytic method type;
   the at least one analytic method type determined based on values of the associated data set, the priorities determined based on the recommendation from users, and the at least one filtering operation determined based on at least one of selected from a group comprising the at least one database column, values in the at least one database column, the at least one visualization type, the at least one user-altered visualization type, and the at least one analytic method type;
   generating a user interface configured for receiving user inputs, wherein the inputs comprise an indication of a set of data for which a visualization is to be provided;
   determining at least one attribute of the set of data;
   analyzing values of the set of data;
   comparing the at least one attribute and the analysis results of the analyzed values with the rules, associated data attributes, and recommendations to determine at least one selected from a group comprising a visualization and a user-altered visualization, and to determine at least one selected from a group comprising an analytical method, and a filtering operation;
   ranking each of the determined visualization, the user-altered visualization, and the analytic method;
   generating a data visualization analytics dashboard configured for:
      displaying at least one selected from a group comprising a ranked visualization and a ranked user-altered visualization;
      displaying results of at least one ranked analytic method and a control panel having a list of columns, the columns capable of being filtered based on each determined filtering operation;
   receiving at least one associated data visualization alteration for at least one displayed selected data visualization; and receiving a user recommendation to at least one of: reject a ranked data visualization of the at least one ranked data visualization; obtain more like the ranked data visualization of the at least one ranked data visualization; and add the ranked data visualization of the at least one ranked data visualization;

storing the user recommendation.

2. The method of claim 1, wherein the indication comprises an indication that the one or more columns of data have been selected via a displayed user interface.

3. The method of claim 2, wherein determining the the at least one attribute of the set of data comprises classifying the each of the one or more columns programmatically as a corresponding type of column.

4. The method of claim 3, wherein each column is classified as one or more of the following: a number, a location, a category, an identifier, a date, a time, a currency, and one or more other defined classifications.

5. The method of claim 3, wherein the classification is based at least in part on a data type of data values comprising a column.

6. The method of claim 3, wherein the classification is based at least in part on a comparison of data values comprising a column with a dictionary or other reference set of values associated with a corresponding classification.

7. The method of claim 3, wherein the classification of the one or more columns is indicated by a user.

8. The method of claim 3, wherein suitable aggregations of columns of data are found using one or both of the processor and input received via an interactive user interface.

9. The method of claim 1, wherein at least one of the determined one or more data attributes is a number of unique values in a column.

10. The method of claim 1, wherein the determined at least one attribute includes hierarchical relationships between two or more selected columns.

11. The method of claim 1, wherein the visualization and analytical method is selected based at least in part on a determined degree of match between a set of data attributes associated with a data visualization and analytical method type with which the selected data visualization and analytical method is associated and at least a subset of the data attributes determined for the set of data.

12. The method of claim 1, wherein the visualization and analytical method is associated with a template that is determined programmatically to be associated with at least a subset of the at least one attribute determined to be associated with the set of data.

13. The method of claim 1, wherein the selected data visualization and analytical method is displayed with one or more other visualizations or analytical methods that are different from the selected visualization and analytical method in an order determined at least in part based on crowd-sourced rating information.

14. The method of claim 1, further comprising displaying via an interactive user interface at least a preview of the visualization and analytical method.

15. The method of claim 1, wherein the interactive user interface enables a user to refine the visualization and analytical method.

16. A system of operating a visualization platform to create context aware recommendations for analytic components, comprising:
a memory; and
a processor coupled to the memory and configured to:

store data sets for database columns, rules for at least one database column and associated data set, associated data set attributes, and recommendations from users for at least one visualization type and at least one user-altered visualization type;

the rules for determining the at least one visualization type and the at least one user-altered visualization type, priorities relative to the at least one visualization type and the at least one user-altered visualization type, at least one analytic method type, and at least one filtering operation for the at least one database column;

the at least one visualization type and the at least one user-altered visualization type determined based on the associated data set attributes and at least one of selected from a group comprising the priorities and the analytic method type;

the at least one analytic method type determined based on values of the associated data set, the priorities determined based on the recommendation from users, and the at least one filtering operation determined based on at least one of selected from a group comprising the at least one database column, values in the at least one database column, the at least one visualization type, the at least one user-altered visualization type, and the at least one analytic method type;

generate a user interface configured for receiving user inputs, wherein the inputs comprise an indication of a set of data for which a data visualization is to be provided;

determine at least one attribute of the set of data;

analyzing values of the set of data;

compare the at least one attribute and the analysis results of the analyzed values with the rules, associated data attributes, and recommendations to determine at least one selected from a group comprising a visualization and a user-altered visualization, and to determine at least one selected from a group comprising an analytical method, and a filtering operation;

rank each of the determined visualization, the user-altered visualization, and the analytic method;

generate a data visualization analytics dashboard configured to:

display at least one selected from a group comprising a ranked visualization; and a ranked user-altered visualization;

display results of at least one ranked analytic method and a control panel having a list of columns, the columns capable of being filtered based on each determined filtering operation;

receive at least one associated data visualization alteration for at least one displayed selected data visualization; and receive a user recommendation to at least one of: reject a ranked data visualization of the at least one ranked data visualization; obtain more like the ranked data visualization of the at least one ranked data visualization; and add the ranked data visualization of the at least one ranked data visualization;

store the user recommendation.

17. The system of claim 16, wherein the set of data comprises one or more selected columns of data and wherein the attributes are determined at least in part by classifying the each of the one or more columns programmatically as a corresponding type of column.

18. The system of claim 17, wherein the visualization and analytical method is selected based at least in part on a determined degree of match between a set of data attributes associated with a data visualization and analytical method type with which the selected data visualization and analytical method is associated and at least a subset of the data attributes determined for the set of data.

19. A computer program product embodied in a non-transitory computer readable medium for operating a visualization platform to create context aware recommendations for analytic components and comprising computer instructions for:
- storing data sets for database columns, rules for at least one database column and associated data set, associated data set attributes, and recommendations from users for at least one visualization type and at least one user-altered visualization type;
- the rules for determining the at least one visualization type and the at least one user-altered visualization type, priorities relative to the at least one visualization type and the at least one user-altered visualization type, at least one analytic method type, and at least one filtering operation for the at least one database column;
- the at least one visualization type and the at least one user-altered visualization type determined based on the associated data set attributes and at least one of selected from a group comprising the priorities and the analytic method type;
- the at least one analytic method type determined based on values of the associated data set, the priorities determined based on the recommendation from users, and the at least one filtering operation determined based on at least one of selected from a group comprising the at least one database column, values in the at least one database column, the at least one visualization type, the at least one user-altered visualization type, and the at least one analytic method type;
- generating a user interface configured for receiving user inputs, wherein the inputs comprise:
  - an indication of a set of data for which a data visualization is to be provided; and
  - a plurality of data attributes and categories of the set of data;
- analyzing values of the set of data;
- comparing the at least one attribute and the analysis results of the analyzed values with the rules, associated data attributes, and recommendations to determine at least one selected from a group comprising a visualization and a user-altered visualization, and to determine at least one selected from a group comprising an analytical method, and a filtering operation;
- ranking each of the determined visualization, the user-altered visualization, and the analytic method;
- generating a data visualization analytics dashboard configured for:
  - displaying at least one selected from a group comprising a ranked visualization and a ranked user-altered visualization;
  - displaying results of at least one ranked analytic method and a control panel having a list of columns, the columns capable of being filtered based on each determined filtering operation;
  - receiving at least one associated data visualization alteration for at least one displayed selected data visualization; and
  - receiving a user recommendation to at least one of: reject a ranked data visualization of the at least one ranked data visualization; obtain more like the ranked data visualization of the at least one ranked data visualization; and add the ranked data visualization of the at least one ranked data visualization;
- storing the user recommendation.

\* \* \* \* \*